United States Patent [19]

Bergholz et al.

[11] 4,348,140

[45] Sep. 7, 1982

[54] CONNECTING DEVICE, PREFERABLY FOR SHEET METAL COMPONENTS OF LIGHT METAL ALLOWS

[75] Inventors: Helmut Bergholz, Hamburg; Walter Tams, Buxtehude, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 226,460

[22] Filed: Jan. 19, 1981

Related U.S. Application Data

[63] Continuation of Ser. No. 952,654, Oct. 19, 1978, abandoned.

[30] Foreign Application Priority Data

Oct. 28, 1977 [DE] Fed. Rep. of Germany ... 7733291[U]

[51] Int. Cl.³ .......................... F16B 5/02; F16B 37/04
[52] U.S. Cl. .................................. 411/103; 411/112; 411/34; 403/408
[58] Field of Search ............... 411/103, 108, 112, 111, 411/134, 135, 34; 403/408

[56] References Cited

U.S. PATENT DOCUMENTS

| | | | |
|---|---|---|---|
| 715,813 | 12/1902 | Karns | 411/94 X |
| 2,336,791 | 12/1943 | Barre | 411/259 X |
| 2,726,009 | 12/1955 | Murdock, Sr. et al. | 411/429 X |
| 3,118,480 | 1/1964 | Kreider | 411/173 |
| 3,176,747 | 4/1965 | Nenzell | 411/103 |
| 3,252,215 | 5/1966 | DeLong et al. | 411/366 X |
| 3,620,119 | 11/1971 | King, Jr. et al. | 411/399 |
| 3,916,970 | 11/1975 | Owens | 411/34 X |
| 4,074,491 | 2/1978 | Bell et al. | 52/394 |

FOREIGN PATENT DOCUMENTS 889887 2/1962 United Kingdom ................. 411/542

Primary Examiner—Ramon S. Britts
Attorney, Agent, or Firm—W. G. Fasse; D. F. Gould

[57] ABSTRACT

The present connecting device for joining sheet metal components has a layer of synthetic material at least in the area of the contact surfaces with neighboring components thus effectively preventing contact corrosion.

4 Claims, 8 Drawing Figures

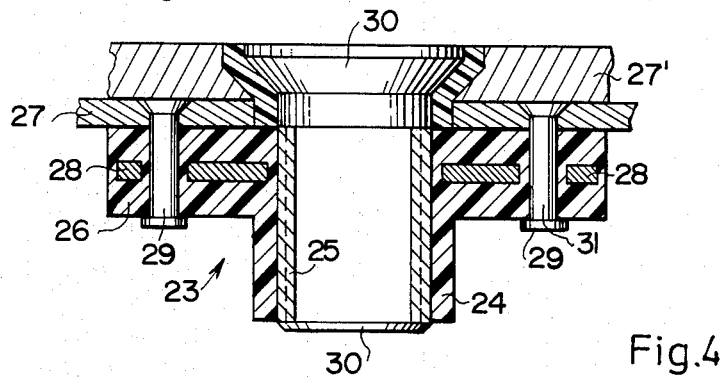
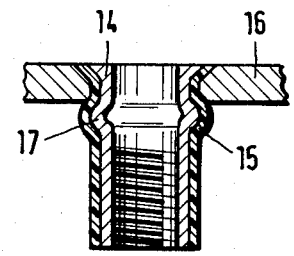
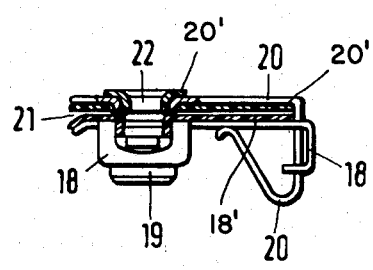
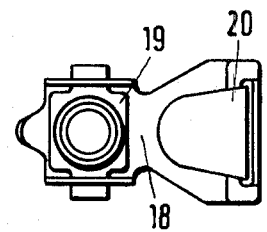

CONNECTING DEVICE, PREFERABLY FOR SHEET METAL COMPONENTS OF LIGHT METAL ALLOWS

This is a continuation of application Ser. No. 952,654 filed Oct. 19, 1978, now abandoned.

BACKGROUND OF THE INVENTION

The invention relates to a corrosion protected connecting device preferably for sheet metal components of light metal alloys primarily applicable in aircraft construction.

The sheet metal components to be connected with known types of connecting devices of the aforementioned type often have a high quality coating for avoiding corrosion. This type of coating is manufactured, for example, with the following process steps: the sheet metal components are pretreated by anodizing or they are covered with yellow chromate; an adhesive primer layer, for example, a phenol base primer layer, is applied and burned-in; a base layer with a polyurethane base is applied and possible burned-in; and finally, a protective layer, possibly also with a polyurethane base is applied. The nuts most typically used are made of steel and have a protective layer of cadium or silver for corrosion protection. A synthetic layer containing $MoS_2$ is applied over the protective layer for providing a dry lubricant. The bolts used are manufactured of steel or titanium. The steel bolts have a cadium layer as corrosion protection. Basically, no corrosion protection is required for titanium screws. However, anodized titanium screws are also used.

The nuts are attached to the sheet metal components by riveting them on, riveting them in, or simply clamping them on. For reasons of production technology, the holes required for attaching the nuts are produced in most instances, only after the sheet metal components have already received their finish coat. Because of this, an electrical contact exists either directly or through the rivets between the sheet metal components and the nuts fastened thereto. The bores through the counterpart are also made after the finish coat has been applied, so that electrical contact of the sheet metal components with the bolts is possible here. Practically all of the participating structural elements have contact with each other since an electrical contact exists between the bolts and the nuts by means of the thread surfaces. The bolt connections described above are very susceptible to contact corrosion because of the very different chemical properties of the metallic materials used, e.g., steel cadium, titanium, and aluminum. The aluminum components are thus very strongly corroded at the points of contact with the adjacent structural elements made of different metals. The high quality finish coating mentioned above offers no protection against such corrosion because of the aforementioned reasons.

A known method of avoiding contact corrosion in bolt connections of the type mentioned, comprises applying a corrosion protective paint coating on the metallic bare surfaces of the bores in the sheet metal components before attaching the nuts or before assembly. This method has, however, the following disadvantages. First, the adhesion of this finish coat to the metal is insufficient because a suitable pretreatment of the outer surface of the metal is no longer possible at the time of use. Second, the application of the finish coat and the delay due to the drying time disturbs the production process.

Another known measure of the type mentioned comprises greasing all the components of the connection before assembly. Such method, however, has the following disadvantages: first, the contact of the components with one another is not interrupted by the grease, and second, contact corrosion sets in if the grease is removed by influences acting during the operation.

According to another known means for avoiding contact corrosion, the joints of the connection are filled during assembly with a rubber elastic curing sealing mass. Such method has the following disadvantages: first, the cleaning of the outer surfaces to be treated does not always meet the standards which must be set for attaining a good adhesion of the sealing mass to the structural elements, and second, contacts between the metal components may not be prevented with certainty as the mass is very soft in the beginning.

According to another known method of avoiding contact corrosion, flat intermediate layers made of electrically isolating material such as hard paper are arranged, for example, between the sheet metal components and the nuts which are to be riveted to the sheet metal components. The disadvantage of this process is seen in that, metallic contact of the bolts and rivets with the inner surfaces of the sheet metal bores are not avoided by these means.

OBJECTS OF THE INVENTION

In view of the above it is the aim of the invention to achieve the following objects singly or in combination:
- to provide an electrically insulating device for bolt connections which substantially interrupts electrical contact between the individual components of the device; and
- to eliminate additional manufacturing steps during assembly such as greasing the components, or applying protective coatings.

SUMMARY OF THE INVENTION

The connecting device of the present invention provides that the individual components of the connecting device have a sufficiently strong layer of synthetic material at least on the contact surfaces with neighboring components.

BRIEF FIGURE DESCRIPTION

In order that the invention may be clearly understood, it will now be described, by way of example, with reference to the accompanying drawings, wherein:

FIG. 4 shows a nut according to FIG. 3 in an installed condition;

FIGS. 5a and 5b show a side view and a top view respectively of a clip nut; and

FIG. 6 shows a view similar to that of FIG. 1 but illustrating a modification.

DETAILED DESCRIPTION OF PREFERRED EXAMPLE EMBODIMENTS ILLUSTRATING THE BEST MODE FOR PRACTICING THE PRESENT INVENTION

Figure 1A:
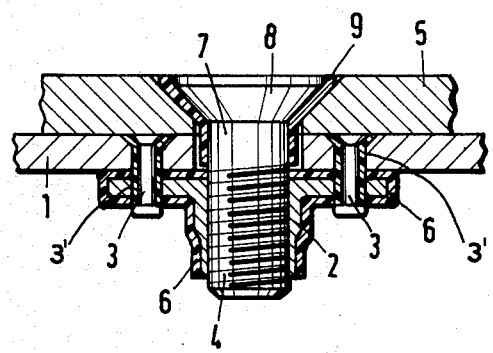
FIG. 1a shows a sectional view of a connecting device with a nut riveted into the sheet metal.
Figure 1B:
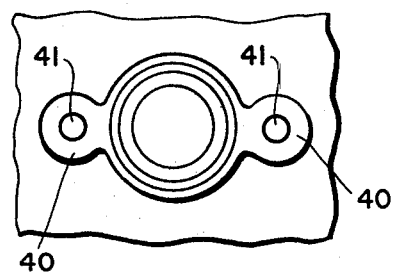
FIG. 1b shows a bottom view of the connecting device in FIG. 1.

FIG. 1a shows a connecting device comprising a sheet metal component 1 and a nut 2 attached to the sheet metal component 1 by two rivets 3. The nut 2 will hereafter be referred to as the riveted nut 2. Another sheet metal component 5 is attached to the component 1 by means of a bolt 4. The riveted nut 2 has, in accordance with the invention, a synthetic material layer 6 covering at least the total contact surface of the riveted nut 2 with the sheet metal component 1. FIG. 1a shows that the entire riveted nut 2 is coated on the outside. This could result in production advantages when manufacturing the nuts. The rivets 3 have a closed layer of synthetic material 3' applied to all sides. The coating 3' of synthetic material may be located on the sides of the rivet 3 as shown in FIG. 1a or on the walls of the rivet holes as shown in FIG. 6. The protective layers applied to both sides of the sheet metal components 1 and 5 are not illustrated. The bores applied to the sheet metal component 1 for the rivets 3 and the bolt 4 have exposed metal inner surfaces. Nonetheless, there is no electrical contact between the components 1, 2, and 3. The bolt 4 has a layer 9 of synthetic material on its shaft 7 and on the underside 8 of the head, so that the bolt 4 does not contact either the sheet metal component 5 or the sheet metal component 1. Contact corrosion does not occur as a result of the metallic contact of the two components within the threads because the bolt 4 and the nut 2 both comprise the same material, that is, cadium clad steel. The thicknesses of the layers of synthetic material are strongly exaggerated for illustrative purposes. In actual practice, layer thicknesses of 0.2 to 0.3 mm are sufficient. FIG. 1b shows a view of the connecting element in FIG. 1a from below with the holding lugs 40 with rivet holes 41 therein. The rivet holes 41 are covered with synthetic insulating material as shown for the rivet holes in the flange plate 28 in FIG. 6.

Figure 2:
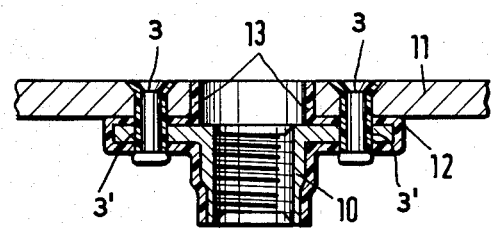
FIG. 2 shows a sectional view through a nut riveted into a sheet metal component, said nut having a tubular projection extending into the sheet metal.

FIG. 2 shows a different embodiment of a riveted nut 10 which is riveted into a sheet metal component 11. A layer 12 of synthetic material covers at least the total surface of the riveted nut 10 facing the sheet metal, and in addition, the riveted nut 10 has a tube shaped projection 13 made of synthetic material. The length of the projecting 13 is so chosen, that according to the thickness of the sheet metal component 11 it may be brought to the proper length by cutting. The clearance diameter of the insert 12 allows the use of bolts with a shank covered with a layer of synthetic material.

FIG. 6 shows a further embodiment of the invention with a riveted nut 23 similar to the riveted nut 2 shown in FIG. 1a comprising a housing 24 made of synthetic material and having a metallic thread insert 25. The housing 24 has a flange 26 with holes therein for attaching the riveted nut 23 to the sheet metal component 27 by means of rivets 29. The flange 26 may include a metallic reinforcing plate 28 sufficiently isolated by synthetic material from the rivets 29 and from the connecting bolt 30. The rivets 29 may have an enclosing coating 31 of synthetic material.

Due to this coating there is no electrical contact between the sheet metal components 27, 27' and the rivets 29 to provide the desired corrosion insulation.

Figure 3:
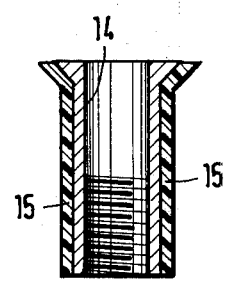
FIG. 3 shows a sectional view through another type of nut which may be riveted into the sheet metal.

FIG. 3 shows a typical riveted nut 14 which has, however, a coating 15 of synthetic material according to the invention. FIG. 4 shows the riveted nut 14 of FIG. 3 in an installed condition. The riveted nut 14 is compressed during the riveting process, forming a bead or collar 17. The bead or collar 17 effects a solid seating of the riveted nut 14 in the structural member 16. The coating 15 of synthetic material has on the one hand a high deformability, so that it may experience the formation of tension cracks. On the other hand however, the coating 1 of synthetic material is sufficiently resistant to creeping to ensure a durable, strong seating of the riveted nut 14 in the structural member 16. The interposition of the coating 15 of synthetic material electrically insulates the riveted nut 14 from the structural member 16 to protect the connection against contact corrosion.

FIG. 5a illustrates a side view of a clip nut of the usual type. FIG. 5b shows a view of the clip nut of FIG. 5a from below. The clip nut comprises a housing 18, a threaded member 19 and a spring 20. The housing 18 and the spring 20 form a gap 21. The clip nut is pushed, for example, onto the edge of a sheet metal component which thus sits, in the gap 21. In this instance, the flange portion of an opening 22 rests in a prebored hole in the sheet metal edge. An embodiment of the clip nut according to the invention comprises a clip nut wherein at least the surfaces of the housing 18 and of the spring 20 which face the gap 21 each have a layer 18' and 20' respectively of synthetic material such that electrical contacts with the sheet metal to be inserted is positively avoided. In this manner, a bolt connection using the clip nut receives an effective protection against contact corrosion.

The selection of material for the isolating layer may include all synthetic materials which fulfill the required specifications with regard to adhesion, strength, deformability, and compressive strength. Thus, isolating layer from synthetic materials such as polyamides, polycarbonates, rigid-PVC and the like may be used. These materials may be supplemented, for example, with material fillers of a fibrous structure.

All known processes such as spraying, melting, extruding, sintering, or applying by means of electrophoresis may be used, for covering the structural elements with the synthetic material. However, the synthetic material coating may also be glued or shrunk on.

Although the invention has been described with reference to specific example embodiments, it is to be understood that it is intended to cover all modifications and equivalents within the scope of the appended claims.

What is claimed is:

1. An aircraft construction threaded nut assembly for transmitting forces between sheet metal pieces, comprising in combination a piece of sheet metal having first and second holes therein, a nut having a threaded hole, means rigidly securing said nut to said piece of sheet metal, whereby said threaded hole registers with a first hole in the piece of sheet metal, said securing means comprising holding means connected to the nut, at least one rivet hole in said holding means registering with a second hole in said piece of sheet metal, and at least one rivet extending through the rivet hole in the holding means of the nut and through a respective second hole in the piece of sheet metal, said assembly further comprising a coating of synthetic insulating material of sufficient mechanical strength for directly transmitting mechanical stress through the coating covering said holding means substantially on all sides including the wall of the rivet hole in the holding means, whereby the nut is insulated from the piece of sheet metal and from the rivet for releasably securing said piece of sheet metal to a further piece of sheet metal in a rigid, force transmitting manner.

2. The assembly of claim 1, wherein said holding means comprise two lugs extending from opposite sides of the nut, each lug having a rivet hole therein.

3. The assembly of claim 1, wherein said holding means comprise a flange plate (28) with rivet holes therein, said flange plate with its holes being coated with said synthetic material (FIG. 6).

4. The assembly of claim 3, wherein said nut is a threaded metal sleeve (25) (FIG. 6).

* * * * *